US010661552B2

(12) United States Patent
Barua et al.

(10) Patent No.: US 10,661,552 B2
(45) Date of Patent: May 26, 2020

(54) SYSTEMS AND METHODS FOR ADVANCED ADDITIVE MANUFACTURING

(71) Applicant: General Electric Company, Schenectady, NY (US)

(72) Inventors: Ananda Barua, Schenectady, NY (US); Arun Karthi Subramaniyan, Clifton Park, NY (US); Daniel Jason Erno, Clifton Park, NY (US); Darren Lee Hallman, Scotia, NY (US)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 15/663,220

(22) Filed: Jul. 28, 2017

(65) Prior Publication Data
US 2019/0030878 A1    Jan. 31, 2019

(51) Int. Cl.
*B33Y 50/02* (2015.01)
*B33Y 10/00* (2015.01)
(Continued)

(52) U.S. Cl.
CPC ............ *B33Y 50/02* (2014.12); *B22F 3/1055* (2013.01); *B29C 64/153* (2017.08); *B29C 64/20* (2017.08);
(Continued)

(58) Field of Classification Search
CPC ......... B33Y 50/02; B33Y 10/00; B33Y 30/00; B33Y 50/00; B29C 64/386; B29C 64/20;
(Continued)

(56) References Cited

U.S. PATENT DOCUMENTS 6,825,856 B1   11/2004  Fazzio et al.
9,135,374 B2    9/2015  Jones et al.
(Continued)

FOREIGN PATENT DOCUMENTS

WO   2016122634 A1    8/2016
WO   2016171649 A1   10/2016
WO   2016201390 A1   12/2016

OTHER PUBLICATIONS

Son Nguyen et al., "A method to generate lattice structure for Additive Manufacturing", Industrial Engineering and Engineering Management (IEEM), 2016 IEEE International Conference on, pp. 966-970, 2016, Bali.
(Continued)

*Primary Examiner* — Thomas C Lee
*Assistant Examiner* — Anzuman Sharmin
(74) *Attorney, Agent, or Firm* — Armstrong Teasdale LLP

(57) ABSTRACT

A controller for use in an additive manufacturing system including a consolidation device configured to consolidate material is provided. The controller is configured to receive a build file for a component including a plurality of build layers, wherein each build layer includes a component outer perimeter, at least one build layer generating function, at least one generating function variable, and at least one generating function constant. The controller is configured to generate at least one control signal to control a power output throughout at least one scan path of the consolidation device across the material for each build layer of the plurality of build layers, the at least one scan path generated based at least partially on the component outer perimeter, the at least one generating function, the at least one generating function variable, and the at least one generating function constant for each build layer.

20 Claims, 4 Drawing Sheets

(51) Int. Cl.
*B29C 64/153* (2017.01)
*B33Y 30/00* (2015.01)
*B22F 3/105* (2006.01)
*B33Y 50/00* (2015.01)
*G05B 19/4099* (2006.01)
*G05B 19/04* (2006.01)
*B29C 64/20* (2017.01)
*B29C 64/386* (2017.01)

(52) U.S. Cl.
CPC ............ *B29C 64/386* (2017.08); *B33Y 10/00* (2014.12); *B33Y 30/00* (2014.12); *B33Y 50/00* (2014.12); *G05B 19/0405* (2013.01); *G05B 19/4099* (2013.01); *B22F 2003/1057* (2013.01); *G05B 2219/49013* (2013.01)

(58) Field of Classification Search
CPC ............ B29C 64/153; G05B 19/0405; G05B 19/4099; G05B 2219/49013; B22F 3/1055; B22F 2003/1057
See application file for complete search history.

(56) References Cited

U.S. PATENT DOCUMENTS

| | | |
|---|---|---|
| 2003/0127436 A1 | 7/2003 | Darrah et al. |
| 2012/0299917 A1* | 11/2012 | Kumar ................ G06F 17/5009 345/420 |
| 2015/0045924 A1 | 2/2015 | Cluckers et al. |
| 2016/0059493 A1* | 3/2016 | Sparks ............... G05B 19/4099 700/98 |
| 2016/0209820 A1* | 7/2016 | Banadyga .......... G05B 19/4099 |
| 2016/0370791 A1 | 12/2016 | Revanur et al. |
| 2017/0011155 A1* | 1/2017 | Ruto ................... G06F 17/5036 |
| 2017/0021455 A1 | 1/2017 | Dallarosa et al. |
| 2017/0066196 A1 | 3/2017 | Beard et al. |
| 2017/0120376 A1 | 5/2017 | Cheverton et al. |
| 2017/0165751 A1* | 6/2017 | Buller .................. B29C 64/307 |
| 2017/0277168 A1* | 9/2017 | Tanaka ............... G05B 19/4099 |

OTHER PUBLICATIONS

Aremu et al., "A voxel-based method of constructing and skinning conformal and functionally graded lattice structures suitable for additive manufacturing", Additive Manufacturing, vol. 13, pp. 1-13, Jan. 2017.

Extended European Search Report and Opinion issued in connection with corresponding EP Application No. 18182937.5 dated Jan. 2, 2019.

Japanese Office Action for related Application No. 2018-138945, dated Dec. 20, 2019, 4 pages (Translated).

* cited by examiner

SYSTEMS AND METHODS FOR ADVANCED ADDITIVE MANUFACTURING

BACKGROUND

The field of the disclosure relates generally to additive manufacturing systems and, more specifically, to systems and methods for manufacturing and rendering a three-dimensional component using a generating function.

Additive manufacturing systems and processes are used to fabricate three-dimensional components. For example, in some additive manufacturing processes, successive layers of material are solidified one on top of the other to fabricate the components. At least some known additive manufacturing systems, such as Direct Metal Laser Melting (DMLM), Selective Laser Sintering (SLS), Direct Metal Laser Sintering (DMLS), and LaserCusing® systems fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) The focused energy source device melts the particulate material on the build platform in and around the area where the focused energy source is incident on the particulate material, resulting in at least one melt pool in a process known as "scanning." Each melt pool cools and consolidates to form at least a portion of the next layer in the build process.

Some known additive manufacturing systems include a controller that receives electronic files and directs the laser using the electronic files. In some known additive manufacturing systems, the electronic files include coordinate data that describe a series of linear sections, e.g., vectors, to approximate portions of the three-dimensional components. However, complex three-dimensional (3D) components require a plurality of linear sections to approximate portions of the components. As the file size is increased to accommodate the plurality of linear sections, the time required for the controller to receive and process the electronic files is increased. Additionally, rendering (i.e. creating a 3D image of the component) can be very memory intensive and can slow the controller's process substantially. As a result, the cost to produce three-dimensional components is increased. In addition, the electronic files limit the precision with which the additive manufacturing system is able to produce the three-dimensional components.

BRIEF DESCRIPTION

In one aspect, a controller for use in an additive manufacturing system including a consolidation device configured to consolidate material is provided. The controller includes a processing device and a memory device coupled to the processing device. The controller is configured to receive a build file for a component including a plurality of build layers, wherein each build layer of the plurality of build layers includes a component outer perimeter, at least one build layer generating function, at least one generating function variable, and at least one generating function constant. The controller is also configured to generate at least one control signal to control a power output throughout at least one scan path of the consolidation device across the material for each build layer of the plurality of build layers, the at least one scan path generated based at least partially on the component outer perimeter, the at least one generating function, the at least one generating function variable, and the at least one generating function constant for each build layer.

In another aspect, an additive manufacturing system is provided. The additive manufacturing system includes at least one consolidation device configured to consolidate a material, an actuator system configured to move the at least one consolidation device across the material, and a controller. The controller is configured to receive a build file for a component including a plurality of build layers, wherein each build layer of the plurality of build layers includes a component outer perimeter, at least one build layer generating function, at least one generating function variable, and at least one generating function constant. The controller is also configured to generate at least one control signal to control a power output throughout at least one scan path of the consolidation device across the material for each build layer of the plurality of build layers, the at least one scan path generated based at least partially on the component outer perimeter, the at least one generating function, the at least one generating function variable, and the at least one generating function constant for each build layer. The controller is further configured to transmit the control signal to the consolidation device to consolidate the material throughout the at least one scan path.

In yet another aspect, a method of fabricating a component with an additive manufacturing system including a consolidation device and a material is provided. The method includes receiving a build file including a plurality of build layers, each build layer of the plurality of build layers including a component outer perimeter, at least one build layer generating function, at least one generating function variable, and at least one generating function constant. The method also includes generating at least one control signal to control a power output throughout at least one scan path of the consolidation device across the material for each build layer of the plurality of build layers, the at least one scan path generated based at least partially on the component outer perimeter, the at least one generating function, the at least one generating function variable, and the at least one generating function constant for each build layer. The method further includes transmitting the at least one control signal to the consolidation device and moving the consolidation device across the material along the at least one scan path based on the at least one control signal to consolidate the material.

DRAWINGS

These and other features, aspects, and advantages of the present disclosure will become better understood when the following detailed description is read with reference to the accompanying drawings in which like characters represent like parts throughout the drawings, wherein.

Figure 1:
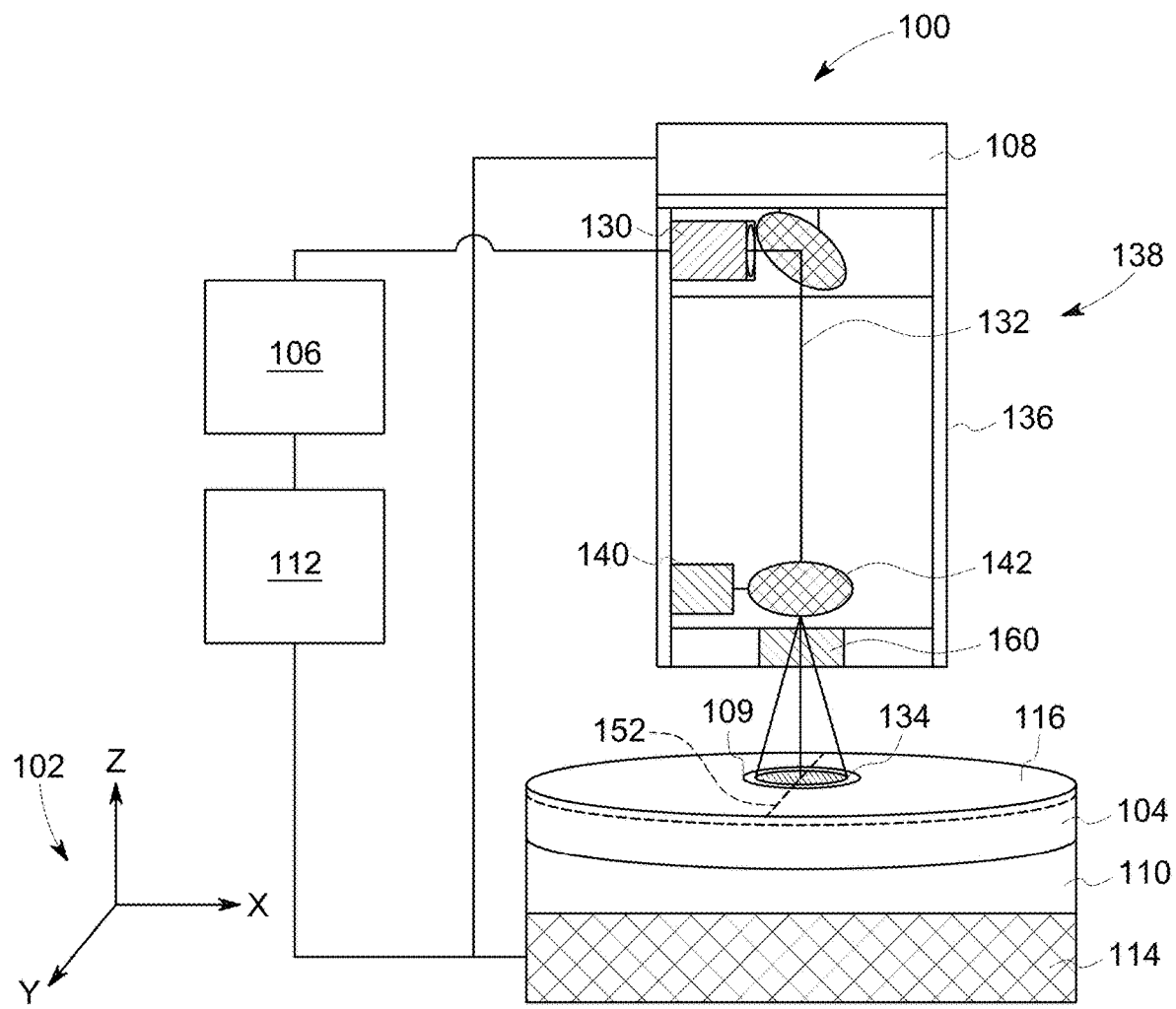
FIG. 1 is a schematic view of an additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. A value modified by the term "substantially similar", as used herein throughout the specification and claims, may be applied to modify any quantitative representation within a range of five percent of the referenced quantitative representation, and more particularly, within a range of one percent of the referenced quantitative representation. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "function" refers to an expression or equation including one or more variables.

Also, as used herein, the term "build file" refers to an electronic representation of a component for use in fabricating the component.

The embodiments described herein facilitate manufacturing a component using an additive manufacturing process. The component is fabricated using a build file including a component outer perimeter, a generating function, a generating function variable, and a generating function constant. Instead of receiving a 3D model of the component containing a plurality of scan paths for a consolidation device, scan paths for consolidating the material to form the component are generated using the component outer perimeter, the generating function, the generating function variable, and the generating function constant associated with each build layer. A consolidation device may comprise, for example, an electro-magnetic radiation source for combining, integrating, fusing, binding or unifying the materials. Accordingly, the build file reduces the memory and processing power required to store and process the data in comparison to at least some known systems. The build file also allows the additive manufacturing system to fabricate components with increased precision and less errors because the controller directs a consolidation device along a scan path generated using the component outer perimeter, the generating function, the generating function variable, and the generating function constant. Additionally, rendering complex structures, such as structures built of unit cells, using the component outer perimeter, the generating function, the generating function variable, and the generating function constant while only rendering the portion of the component within a viewing window reduces the memory and processing power required to render the image in comparison to at least some known systems.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LIVID—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 100. A coordinate system 102 includes an x-axis, a y-axis, and a z-axis. In the exemplary embodiment, additive manufacturing system 100 includes a controller 106, a mounting system 108, a powder bed 110, an actuator system 112, a support structure 114, and a consolidation device 138, all of which are described below in more detail. In alternative embodiments, additive manufacturing system 100 may include any other components that enable additive manufacturing system 100 to function as described herein.

In the exemplary embodiment, consolidation device 138 includes a laser device 130, a scanning motor 140, a scanning mirror 142, and a scanning lens 160 for fabricating a component 104 using a layer-by-layer manufacturing process. Laser device 130 provides a high-intensity heat source configured to generate a melt pool 134 (not shown to scale) in a powdered material 109 using an energy beam 132. Laser device 130 is contained within a housing 136 that is coupled to a mounting system 108. Additive manufacturing system 100 also includes a computer control system, or controller 106. Mounting system 108 is moved by an actuator or actuator system 112 that is configured to move mounting system 108 in an XY plane to cooperate with scanning mirror 142 to facilitate fabricating a layer of component 104 within additive manufacturing system 100. For example, and without limitation, mounting system 108 is pivoted about a central point, moved in a linear path, a curved path, and/or rotated to cover a portion of the powdered material 109 on powder bed 110 to facilitate directing energy beam 132 along the surface of component 104. Alternatively, housing 136 and energy beam 132 are moved in any orientation and manner that enables additive manufacturing system 100 to function as described herein.

Scanning motor 140 is controlled by controller 106 and is configured to move scanning mirror 142 such that energy beam 132 is reflected to be incident along a predetermined path along powder bed 110, such as, for example, and without limitation, a linear and/or rotational scan path 152. In the exemplary embodiment, the combination of scanning motor 140 and scanning mirror 142 forms a two-dimension scan galvanometer. Alternatively, scanning motor 140 and scanning mirror 142 may include a 3D scan galvanometer, dynamic focusing galvanometer, and/or any other scanning method that may be used to deflect energy beam 132 of laser device 130.

In the exemplary embodiment, powder bed 110 is mounted to support structure 114, which is moved by actuator system 112. As described above with respect to mounting system 108, actuator system 112 is also configured to move support structure 114 in a Z direction (i.e., normal to a top surface of powder bed 110). In some embodiments, actuator system 112 is also configured to move support structure 114 in the XY plane. For example, and without limitation, in an alternative embodiment where housing 136 is stationary, actuator system 112 moves support structure 114 in the XY plane to cooperate with scanning motor 140 and scanning mirror 142 to direct energy beam 132 of laser device 130 along scan path 152 about powder bed 110. In the exemplary embodiment, actuator system 112 includes, for example, and without limitation, a linear motor(s), a hydraulic and/or pneumatic piston(s), a screw drive mechanism(s), and/or a conveyor system.

In the exemplary embodiment, additive manufacturing system 100 is operated to fabricate component 104 from a computer modeled representation of the 3D geometry of component 104. The computer modeled representation may be produced in a computer aided design (CAD) or similar file. The CAD file of component 104 is converted into a layer-by-layer format that includes a plurality of build parameters for each layer of component 104, for example, build layer 116 of component 104. In the exemplary embodiment, component 104 is modeled in a desired orientation relative to the origin of the coordinate system used in additive manufacturing system 100. The geometry of component 104 is sliced into a stack of layers of a desired thickness, such that the geometry of each layer is an outline of the two-dimensional (2D) geometry of component 104 at that particular layer location. The build parameters are applied along scan path 152 to fabricate that layer of component 104 from the material used to construct component 104. The steps are repeated for each respective layer of component 104 geometry. Once the process is completed, an electronic computer build file (or files) is generated, including all of the layers. The build file is loaded into controller 106 of additive manufacturing system 100 to control the system during fabrication of each layer.

After the build file is loaded into controller 106, additive manufacturing system 100 is operated to generate component 104 by implementing the layer-by-layer manufacturing process, such as a direct metal laser melting method. The exemplary layer-by-layer additive manufacturing process does not use a pre-existing article as the precursor to the final component, rather the process produces component 104 from a raw material in a configurable form, such as a powder. For example, and without limitation, a steel component can be additively manufactured using a steel powder. Additive manufacturing system 100 enables fabrication of components, such as component 104, using a broad range of materials, for example, and without limitation, metals, ceramics, glass, and polymers.

Figure 2:
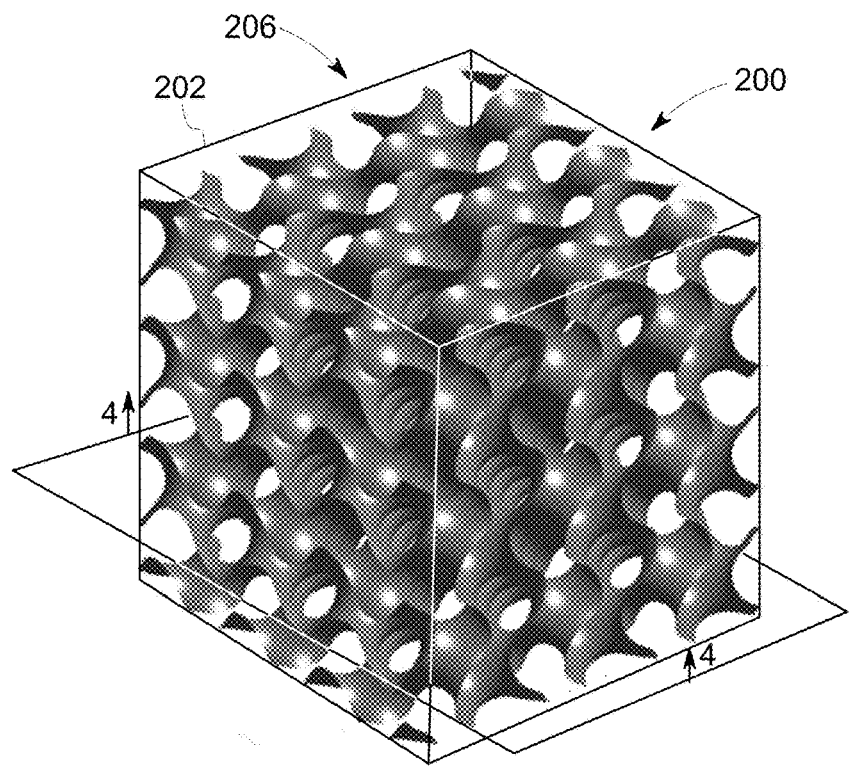
FIG. 2 is a perspective view of a component with an exemplary unit cell structure.
Figure 3:
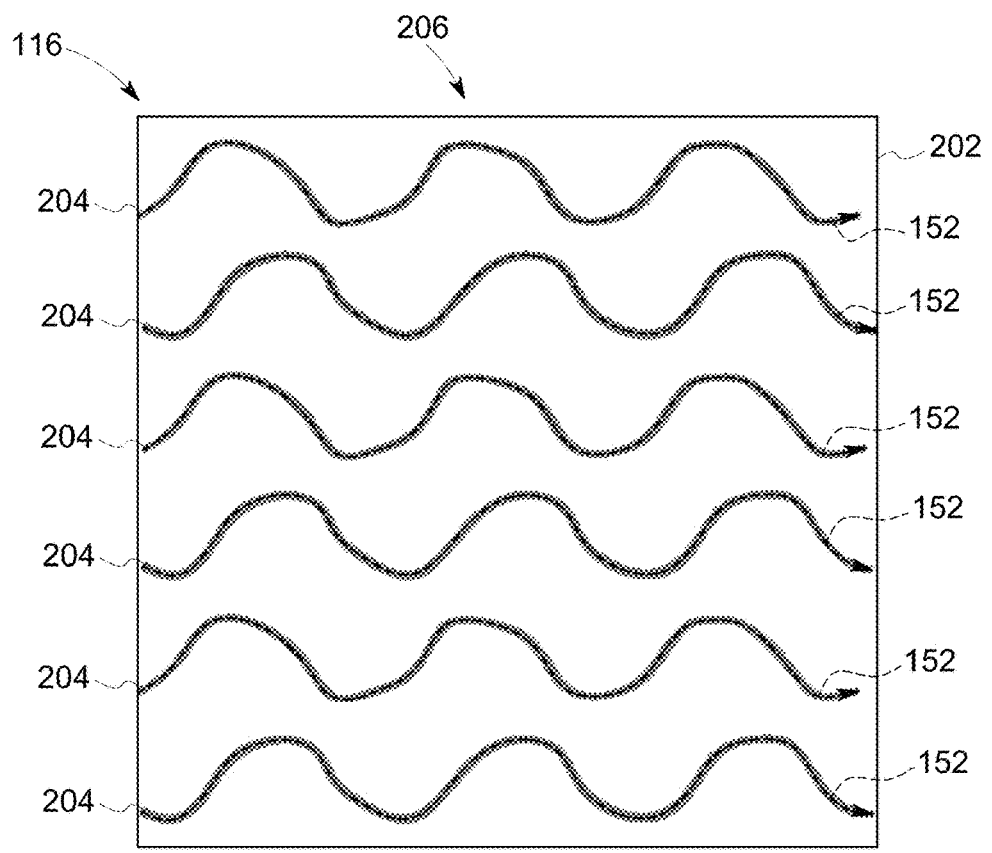
FIG. 3 is a section view of the component taken about section line 4-4 of FIG. 2 illustrating an exemplary build layer.

FIG. 2 is a perspective view of a component 200 with an exemplary unit cell structure 206. FIG. 3 is a section view of component 200 taken about section line 4-4 of FIG. 2 illustrating an exemplary build layer 116. In the exemplary embodiment, unit cell structure 206 of component 200 includes a repeating lattice structure. Build layer 116 corresponding to section 4-4 includes a plurality of component internal geometries 204, defining the internal 2D cross-section of component 200 within build layer 116, and a component outer perimeter 202, defining the outer perimeter boundaries of component 200. A plurality of scan paths 152 overlay component internal geometry 204.

Figure 4:
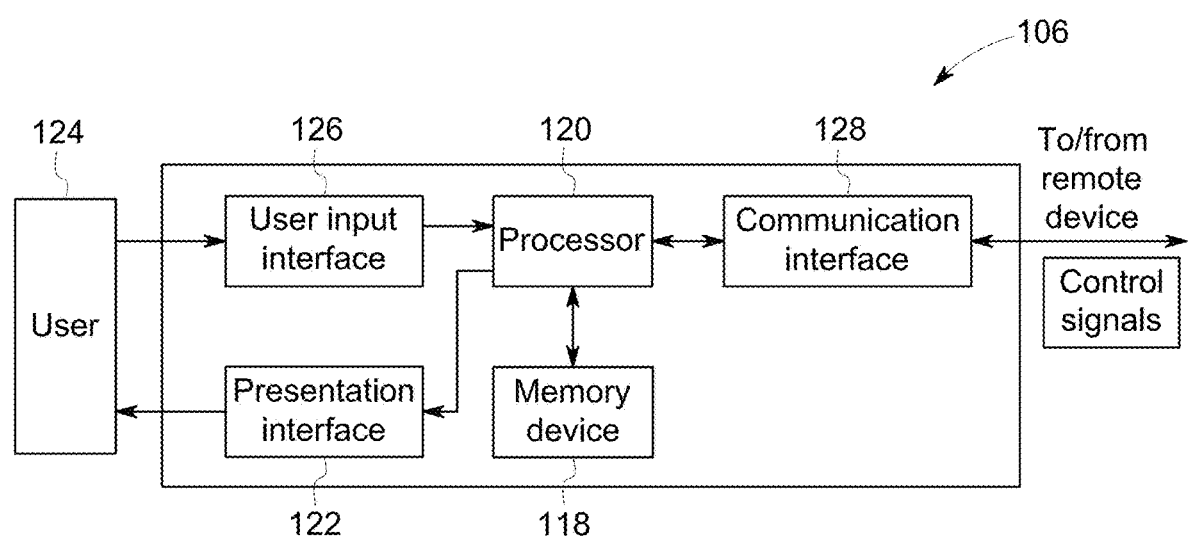
FIG. 4 is a block diagram of a controller that is used to operate the additive manufacturing system shown in FIG. 1.

FIG. 4 is a block diagram of controller 106 that is used to operate additive manufacturing system 100 (shown in FIG. 1). In the exemplary embodiment, controller 106 is any type of controller typically provided by a manufacturer of additive manufacturing system 100 to control operation of additive manufacturing system 100. Controller 106 executes operations to control the operation of additive manufacturing system 100 based at least partially on instructions from human operators. Controller 106 includes, for example, a plurality of 2D build parameters representing the 3D model of component 104 to be fabricated by additive manufacturing system 100. Operations executed by controller 106 include controlling power output of laser device 130 (shown in FIG. 1) and adjusting mounting system 108 and/or support structure 114, via actuator system 112 (all shown in FIG. 1) to control the scanning velocity of energy beam 132. Controller 106 is also configured to control scanning motor 140 to direct scanning mirror 142 to further control the scanning velocity of energy beam 132 within additive manufacturing system 100.

In the exemplary embodiment, controller 106 includes a memory device 118 and a processor 120 coupled to memory device 118. Processor 120 may include one or more processing units, such as, without limitation, a multi-core configuration. Processor 120 is any type of processor that permits controller 106 to operate as described herein. In some embodiments, executable instructions are stored in memory device 118. Controller 106 is configurable to perform one or more operations described herein by programming processor 120. For example, processor 120 may be programmed by encoding an operation as one or more executable instructions and providing the executable instructions in memory device 118. In the exemplary embodiment, memory device 118 is one or more devices that enable storage and retrieval of information such as executable instructions or other data. Memory device 118 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 118 may be configured to store any type of data, including, without limitation, build parameters associated with component 104. In some embodiments, processor 120 removes or "purges" data from memory device 118 based on the age of the data. For example, processor 120 may overwrite previously recorded and stored data associated with a subsequent time or event. In addition, or alternatively, processor 120 may remove data that exceeds a predetermined time interval. In addition, memory device 118 includes, without limitation, sufficient data, algorithms, and commands to facilitate monitoring of build parameters and the geometric conditions of component 104 being fabricated by additive manufacturing system 100.

In some embodiments, controller 106 includes a presentation interface 122 coupled to processor 120. Presentation interface 122 presents information, such as the operating conditions of additive manufacturing system 100, to a user 124. In one embodiment, presentation interface 122 includes a display adapter (not shown) coupled to a display device (not shown) having a 2D size, such as a cathode ray tube (CRT), a liquid crystal display (LCD), an organic LED (OLED) display, or an "electronic ink" display. In some embodiments, presentation interface 122 includes one or more display devices. In addition, or alternatively, presentation interface 122 includes an audio output device (not shown), for example, without limitation, an audio adapter or a speaker (not shown).

In some embodiments, controller 106 includes a user input interface 126. In the exemplary embodiment, user input interface 126 is coupled to processor 120 and receives input from user 124. User input interface 126 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 122 and user input interface 126.

In the exemplary embodiment, a communication interface 128 is coupled to processor 120 and is configured to be coupled in communication with one or more other devices, such as laser device 130, and to perform input and output operations with respect to such devices while performing as an input channel. For example, communication interface 128 may include, without limitation, a wired network adapter, a wireless network adapter, a mobile telecommunications adapter, a serial communication adapter, or a parallel communication adapter. Communication interface 128 may receive a data signal from or transmit a data signal to one or more remote devices. For example, in some embodiments, communication interface 128 of controller 106 may transmit/receive a data signal to/from actuator system 112.

Presentation interface 122 and communication interface 128 are both capable of providing information suitable for use with the methods described herein, such as, providing information to user 124 or processor 120. Accordingly, presentation interface 122 and communication interface 128 may be referred to as output devices. Similarly, user input interface 126 and communication interface 128 are capable of receiving information suitable for use with the methods described herein and may be referred to as input devices.

In the exemplary embodiment, with reference to FIGS. 1-4, memory device 118 is configured to receive a build file for component 104 including a plurality of build layers 116. Each of the plurality of build layers 116 includes component outer perimeter 202, at least one build layer generating function, at least one generating function variable, and at least one generating function constant. Component outer perimeter 202 defines the outer perimeter of component 104 for each build layer 116 and includes a list of coordinate points and/or vectors to approximate the outer perimeter of component 104. The generating function at least partially defines the internal perimeter of component 104 for each build layer 116. In some embodiments, the component outer perimeter may overlie at least a portion of the internal perimeter of component 104 defined by the generating function.

In the exemplary embodiment, the generating function may, for example, without limitation, define at least one of a B-spline curve, a Hilbert curve, a lattice structure, and a unit cell. In alternative embodiments, the at least one generating function includes a first generating function relating to a first portion of component 104 and a second generating function relating to a second portion of component 104. In another alternative embodiment, the at least one generating function is input to memory device 118 through user input interface 126 by user 124 for use by processor 120, wherein the at least one generating function is executable to define at least one of internal geometry 204 and scan paths 152 of component 104 within build layer 116 based on input from user 124.

As used herein, the term "generating function constant" refers to input values for constants of a generating function. In some embodiments, at least one generating function constant is provided to controller 106 along with at least one generating function. In some embodiments, at least one generating function constant is provided to controller 106 by user 124 through user input interface 126. In further embodiments, sets of generating function constants are stored on controller 106 and at least one set of generating function constants is selected for one or more curves. Accordingly, the generating function constants allow the at least one generating function to represent a plurality of different curves and reduce the data required to generate the curves that must be stored in memory device 118.

As used herein, the term "generating function variable" refers to input variables of the generating function. In the exemplary embodiment, a set of generating function variables are provided to controller 106, in addition to at least one generating function and at least one generating function constant. In some embodiments, at least one generating function variable is provided to controller 106 by user 124 through user input interface 126. The generating function variables are determined based on a specific curve of internal geometry 204 of component 104. Because the build file includes at least one generating function and at least one generating function constant, the quantity of generating function variables required to generate internal geometry 204 is reduced in comparison to a list of coordinate points or vectors used in at least some known systems to approximate a curve. In alternative embodiments, the build file includes any values that enable additive manufacturing system 100 to operate as described herein.

In the exemplary embodiment, once build layers 116 of component 104 have been generated and provided to controller 106, controller 106 is operated to generate at least one control signal to control a power output throughout at least one scan path 152 of consolidation device 138 across powder bed 110 for each build layer 116 of the plurality of build layers 116. In some embodiments, controller 106 generates a non-uniform energy intensity profile for at least one scan path 152, wherein the non-uniform energy intensity profile facilitates consolidating material 109 having at least one predetermined characteristic. At least one scan path 152 is generated based at least partially on component outer perimeter 202, the at least one generating function, the at least one generating function variable, and the at least one generating function constant for each build layer 116. More specifically, for each build layer 116, controller 106 uses component outer perimeter 202, the at least one generating function, the at least one generating function variable, and the at least one generating function constant to determine internal geometry 204 of component 104 within each build layer 116. Based on the determined internal geometry 204 of component 104 within each build layer 116, controller 106 generates as many scan paths 152 as are necessary to enable consolidation device 138 to consolidate material 109 to form internal geometry 204.

Figure 5:
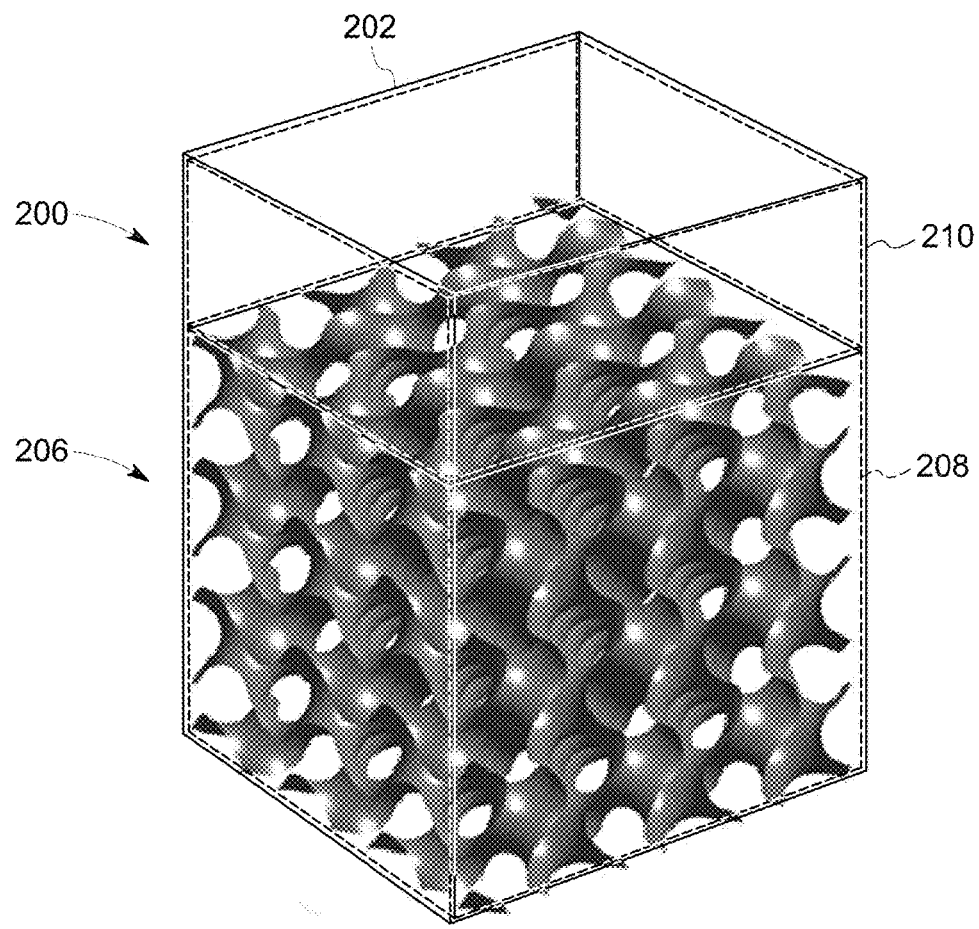
FIG. 5 is a perspective view of an exemplary representation of a 3D geometry of a first portion of a component generated by the controller shown in FIG. 4.

FIG. 5 is a perspective view of an exemplary representation of a 3D geometry of first portion 208 of component 104 generated by controller 106 (shown in FIG. 4). In the exemplary embodiment, controller 106 may be operated to generate a representation of the 3D geometry of component 104, wherein the representation of the 3D geometry of component 104 is generated based on component outer perimeter 202, the at least one generating function, the at least one generating function variable, and the at least one generating function constant for each build layer 116. In the exemplary embodiment, controller 106 generates a representation of the 3D geometry of first portion 208 of component 104, wherein first portion 208 of component 104 does not include the entirety of component 104 as defined by component outer perimeter 202. The generated representation of the 3D geometry of first portion 208 of component 104 is then displayed on presentation interface 122 of controller 106, wherein a 2D cross-sectional size of the generated 3D geometry of first portion 208 is substantially similar to the 2D cross-sectional size of a viewing window of presentation interface 122.

In the exemplary embodiment, second portion 210 of component 104 represents the portion of component 104 for which controller 106 does not generate a representation of the 3D geometry until the 2D cross-sectional size of the viewing window of presentation interface 122 corresponds to at least a portion of the area of component 104 represented by second portion 210. In the exemplary embodiment, user 124 is able to modify the viewing window of presentation interface 122 through user input interface. Generating a representation of the 3D geometry of component 104 only for the portion, for example, first portion 208, of component 104 that is viewable on the viewing window of presentation interface 122 facilitates reducing the required processing power of processor 120 and the storage capability of memory device 118, and facilitates more rapid rendering of the representation of the 3D geometry of component 104.

Figure 6:
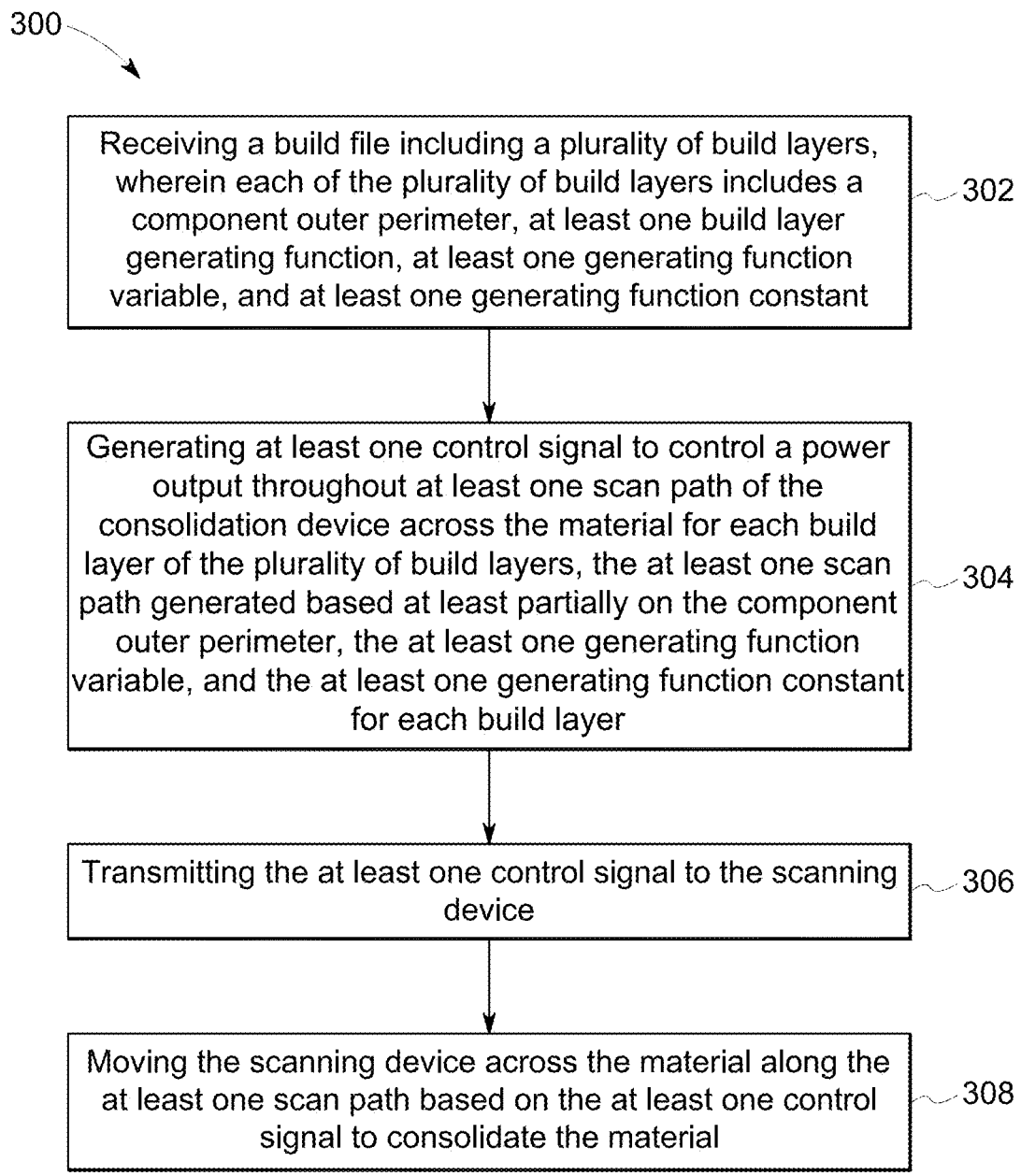
FIG. 6 is a flow chart illustrating a method for fabricating a component with an additive manufacturing system.

FIG. 6 is a flow chart illustrating a method 300 for fabricating a component 104 with an additive manufacturing system 100 including a consolidation device 138 and a material 109. Referring to FIGS. 1, 2, 4, and 6, method 300 includes receiving 302 a build file including a plurality of build layers 116, wherein each of the plurality of build layers 116 includes a component outer perimeter 202, at least one generating function, at least one generating function variable, and at least one generating function constant. Method 300 also includes generating 304 at least one control signal to control a power output throughout at least one scan path 152 of consolidation device 138 across material 109 for each build layer 116 of the plurality of build layers 116, the at least one scan path 152 generated based at least partially on component outer perimeter 202, the at least one generating function, the at least generating function variable, and the at least one generating function constant for each build layer. Method 300 further includes transmitting 306 the at least one control signal to consolidation device 138 and moving 308 consolidation device 138 across material 109 along the at least one scan path 152 based on the at least one control signal to consolidate material 109.

An exemplary technical effect of the methods, systems, and apparatus described herein includes at least one of: (a) reducing memory and processing requirements for additively manufacturing 3D components; (b) reducing memory and processing requirements for rendering 3D components; (c) decreasing cost to assemble three-dimensional components using an additive manufacturing system; (c) increasing the precision with which three-dimensional components are produced; and (e) increasing the compatibility of additive manufacturing systems with modeling software.

The above-described embodiments provide systems and methods for fabricating a component using an additive manufacturing process. The component is fabricated using a build file including a component outer perimeter, a generating function, a generating function variable, and a generating function constant. Instead of receiving a 3D model of the component containing a plurality of scan paths for a consolidation device, scan paths for consolidating the material to form the component are generated using the component outer perimeter, the generating function, the generating function variable, and the generating function constant associated with each build layer. Accordingly, the build file reduces the memory and processing power required to store and process the data in comparison to at least some known systems. The build file also allows the additive manufacturing system to fabricate components with increased precision and less errors because the controller directs a consolidation device along a scan path generated using the component outer perimeter, the generating function, the generating function variable, and the generating function constant. Additionally, rendering complex structures, such as structures built of unit cells, using the component outer perimeter, the generating function, the generating function variable, and the generating function constant while only rendering the portion of the component within the viewing window reduces the memory and processing power required to render the image in comparison to at least some known system.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A controller for use in an additive manufacturing system including a consolidation device, the consolidation device configured to consolidate material, said controller comprising a processing device and a memory device coupled to said processing device, said controller configured to:

receive a build file for a component including a plurality of build layers representing sliced portions of the component as a whole, wherein each build layer of the plurality of build layers includes a component outer perimeter, at least one build layer generating function, at least one generating function variable, and at least one generating function constant, wherein the at least one generating function is a mathematical function that takes the at least one generating function variable and the at least one generating function constant as input values to define an internal geometry within the component outer perimeter for the associated build layer;

generate at least one control signal to control a power output throughout at least one scan path of the consolidation device across the material for each build layer of the plurality of build layers, the at least one scan path for each build layer corresponding to the internal geometry defined by the at least one generating function for that build layer; and transmit the control signal to the consolidation device to consolidate the material throughout the at least one scan path.

2. The controller in accordance with claim 1, wherein said controller is further configured to:

generate a representation of a three-dimensional (3D) geometry of the component, wherein the representation of the 3D geometry of the component is generated based on the component outer perimeter, the at least one generating function, the at least one generating function variable, and the at least one generating function constant for each build layer; and display the generated representation of the 3D geometry on a controller presentation interface.

3. The controller in accordance with claim 1, wherein said controller is further configured to:

divide the component into a first portion and a second portion;

generate a representation of a 3D geometry of only the first portion of the component, wherein the representation of the 3D geometry of the first portion of the component is generated based on the component outer perimeter, the at least one generating function, the at least one generating function variable, and the at least one generating function constant for each build layer; and display only the generated representation of the 3D geometry of the first portion of the component on a controller presentation interface, wherein a two-dimensional (2D) size of the generated representation of the 3D geometry of the first portion of the component is substantially similar to a 2D size of the controller presentation interface.

4. The controller in accordance with claim 1, wherein the at least one generating function defines at least one of a B-spline curve, a Hilbert curve, a lattice, and a unit cell.

5. The controller in accordance with claim 4, wherein the at least one generating function includes a first generating function relating to a first portion of the internal geometry of the component and a second generating function relating to a second portion of the internal geometry of the component.

6. The controller in accordance with claim 1, further comprising a user input interface, wherein the at least one generating function is executable to at least partially define the at least one scan path based on at least one user input received using said user input interface.

7. The controller in accordance with claim 1, wherein said controller is further configured to generate a non-uniform energy intensity profile for the at least one scan path of the consolidation device, wherein the non-uniform energy intensity profile facilitates consolidating the material.

8. An additive manufacturing system comprising:
at least one consolidation device configured to consolidate a material;
an actuator system configured to move said at least one consolidation device across the material; and
a controller configured to:
receive a build file for a component including a plurality of build layers representing sliced portions of the component as a whole, wherein each build layer of the plurality of build layers includes a component outer perimeter, at least one build layer generating function, at least one generating function variable, and at least one generating function constant, wherein the at least one generating function is a mathematical function that takes the at least one generating function variable and the at least one generating function constant as input values to define an internal geometry within the component outer perimeter for the associated build layer;
generate at least one control signal to control a power output throughout at least one scan path of the consolidation device across the material for each build layer of the plurality of build layers, the at least one scan path for each build layer corresponding to the internal geometry defined by the at least one generating function for that build layer; and
transmit the control signal to the consolidation device to consolidate the material throughout the at least one scan path.

9. The additive manufacturing system of claim 8, wherein said controller is further configured to:
generate a representation of a three-dimensional (3D) geometry of the component, wherein the representation of the 3D geometry of the component is generated based on the component outer perimeter, the at least one generating function, the at least one generating function variable, and the at least one generating function constant for each build layer; and
display the generated representation of the 3D geometry on a controller presentation interface.

10. The additive manufacturing system of claim 8, wherein said controller is further configured to:
divide the component into a first portion and a second portion;
generate a representation of a 3D geometry of only the first portion of the component, wherein the representation of the 3D geometry of the first portion of the component is generated based on the component outer perimeter, the at least one generating function, the at least one generating function variable, and the at least one generating function constant for each build layer; and
display only the generated representation of the 3D geometry of the first portion of the component on a controller presentation interface, wherein a 2D size of the generated representation of the 3D geometry of the first portion of the component is substantially similar to a 2D size of the controller presentation interface.

11. The additive manufacturing system of claim 8, wherein the at least one generating function defines at least one of a B-spline curve, a Hilbert curve, a lattice, and a unit cell.

12. The additive manufacturing system of claim 11, wherein the at least one generating function includes a first generating function relating to a first portion of the internal geometry of the component and a second generating function relating to a second portion of the internal geometry of the component.

13. The additive manufacturing system of claim 8, wherein said controller further comprises a user input interface, wherein the at least one generating function is executable to define the at least one scan path based on at least one user input received using said user input interface.

14. The additive manufacturing system of claim 8, wherein said controller is further configured to generate a non-uniform energy intensity profile for the at least one scan path of the consolidation device, wherein the non-uniform energy intensity profile facilitates consolidating the material.

15. A method of fabricating a component using an additive manufacturing system including a consolidation device and a material, said method comprising:
receiving a build file including a plurality of build layers representing sliced portions of the component as a whole, wherein each build layer of the plurality of build layers includes a component outer perimeter, at least one build layer generating function, at least one generating function variable, and at least one generating function constant, wherein the at least one generating function is a mathematical function that takes the at least one generating function variable and the at least one generating function constant as input values to define an internal geometry within the component outer perimeter for the associated build layer;
generating at least one control signal to control a power output throughout at least one scan path of the consolidation device across the material for each build layer of the plurality of build layers, the at least one scan path for each build layer corresponding to the internal geometry defined by the at least one generating function for that build layer;
transmitting the at least one control signal to the consolidation device; and
moving the consolidation device across the material along the at least one scan path based on the at least one control signal to consolidate the material.

16. The method of claim 15, wherein receiving the build file further comprises:
generating a representation of a 3D geometry of the component, wherein the representation of the 3D geometry of the component is generated based on the component outer perimeter, the at least one generating function, the at least one generating function variable, and the at least one generating function constant for each build layer; and
displaying the generated representation of the 3D geometry on a controller presentation interface.

17. The method of claim 15, wherein receiving the build file further comprises:
- dividing the component into a first portion and a second portion;
- generating a representation of a 3D geometry of only the first portion of the component, wherein the representation of the 3D geometry of the first portion of the component is generated based on the component outer perimeter, the at least one generating function, the at least one generating function variable, and the at least one generating function constant for each build layer; and
- displaying only the generated representation of the 3D geometry of the first portion of the component on a controller presentation interface, wherein a 2D size of the generated representation of the 3D geometry of the first portion of the component is substantially similar to a 2D size of the controller presentation interface.

18. The method of claim 15, wherein generating the at least one control signal further comprises generating the at least one scan path based at least partially on at least one generating function defining at least one of a B-spline curve, a Hilbert curve, a lattice, and a unit cell.

19. The method of claim 18, wherein generating the at least one control signal further comprises generating the at least one scan path based at least partially on a first generating function relating to a first portion of the internal geometry of the component and a second generating function relating to a second portion of the internal geometry of the component.

20. The method of claim 15, further comprising controlling a power output of the consolidation device by generating a non-uniform energy intensity profile for the at least one scan path of the consolidation device, wherein the non-uniform energy intensity profile facilitates consolidating the material.

* * * * *